United States Patent
Freitas Fortuna Dos Santos et al.

(10) Patent No.: US 10,489,561 B2
(45) Date of Patent: *Nov. 26, 2019

(54) WEB APPLICATION PROTECTION

(71) Applicant: JSCRAMBLER S.A., Oporto (PT)

(72) Inventors: Antonio Pedro Freitas Fortuna Dos Santos, Maia (PT); Rui Miguel Silvares Ribeiro, Lisbon (PT); Filipe Manuel Gomes Silva, Povoa do Varzin (PT)

(73) Assignee: JSCRAMBLER S.A., Oporto (PT)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,952

(22) Filed: Jun. 12, 2018

(65) Prior Publication Data

US 2018/0293365 A1    Oct. 11, 2018

Related U.S. Application Data (63) Continuation of application No. 14/894,919, filed as application No. PCT/IB2014/061841 on May 30, 2014, now Pat. No. 10,095,846.

(Continued)

(51) Int. Cl.
*G06F 21/12* (2013.01)
*H04L 9/08* (2006.01)
(Continued)

(52) U.S. Cl.
CPC .............. *G06F 21/12* (2013.01); *G06F 21/10* (2013.01); *G06F 21/125* (2013.01); *G06F 21/14* (2013.01);
(Continued)

(58) Field of Classification Search
CPC ....... H04L 9/14; H04L 9/0866; H04L 9/0822; G06F 21/10; G06F 21/12; G06F 21/125; G06F 21/14
See application file for complete search history.

(56) References Cited

U.S. PATENT DOCUMENTS 5,774,651 A * 6/1998 Akiyama ................ G06F 21/10
                                                            705/59
6,006,328 A   12/1999 Drake
(Continued)

FOREIGN PATENT DOCUMENTS

WO    WO-2006/0134304 A2    12/2006

OTHER PUBLICATIONS

Yu, Yang, and Tzi-cker Chiueh. "Display-only file server: A solution against information theft due to insider attack." Proceedings of the 4th ACM workshop on Digital rights management, (pp. 31-39). ACM, 2004. (Year: 2004).*

(Continued)

*Primary Examiner* — Kari L Schmidt
(74) *Attorney, Agent, or Firm* — Harness, Dickey & Pierce, P.L.C.

(57) ABSTRACT

A method and system for generating a protected version of the digital content is disclosed. The method includes obfuscating the digital content to yield a functionally equivalent obfuscated digital content, encrypting the obfuscated digital content using at least one device or non-device parameter, generating a decryption logic to be used for generating a decryption key based upon the at least one device or non-device parameter, and concatenating the encrypted digital content and the decryption logic to generate the protected version of the digital content.

10 Claims, 6 Drawing Sheets

Related U.S. Application Data (60) Provisional application No. 61/828,722, filed on May 30, 2013.

(51) Int. Cl.
*H04L 9/14* (2006.01)
*G06F 21/10* (2013.01)
*G06F 21/14* (2013.01)

(52) U.S. Cl.
CPC .......... *H04L 9/0822* (2013.01); *H04L 9/0866* (2013.01); *H04L 9/14* (2013.01); *G06F 2221/0704* (2013.01); *G06F 2221/0748* (2013.01)

(56) References Cited

U.S. PATENT DOCUMENTS

| | | | |
|---|---|---|---|
| 6,272,636 B1 | 8/2001 | Neville et al. | |
| 6,640,305 B2 | 10/2003 | Kocher et al. | |
| 6,668,325 B1 | 12/2003 | Collberg et al. | |
| 7,054,443 B1* | 5/2006 | Jakubowski | G11B 20/00086 380/201 |
| 7,984,511 B2 | 7/2011 | Kocher et al. | |
| 8,220,058 B2 | 7/2012 | de Jong | |
| 8,887,290 B1 | 11/2014 | Denton et al. | |
| 9,129,089 B2* | 9/2015 | DiAcetis | G06F 21/10 |
| 9,836,612 B2 | 12/2017 | Li | |
| 2002/0016919 A1* | 2/2002 | Sims, III | G06F 21/10 713/193 |
| 2002/0083318 A1 | 6/2002 | Larose | |
| 2002/0144153 A1* | 10/2002 | LeVine | G06F 21/10 726/33 |
| 2004/0030912 A1 | 2/2004 | Merkle et al. | |
| 2004/0054894 A1* | 3/2004 | Lambert | G06F 21/10 713/165 |
| 2004/0123104 A1* | 6/2004 | Boyen | G06F 21/602 713/165 |
| 2005/0021989 A1 | 1/2005 | Johnson et al. | |
| 2005/0021995 A1* | 1/2005 | Lal | G06F 21/10 726/4 |
| 2005/0069131 A1* | 3/2005 | de Jong | G06F 21/14 380/239 |
| 2006/0048228 A1* | 3/2006 | Takemori | G06F 21/577 726/22 |
| 2007/0208953 A1* | 9/2007 | Durand | G06F 21/10 713/193 |
| 2009/0061934 A1* | 3/2009 | Hauck | H04W 8/265 455/558 |
| 2010/0241872 A1 | 9/2010 | Pinder | |
| 2011/0055917 A1 | 3/2011 | Wickstrom | |
| 2012/0124372 A1* | 5/2012 | Dilley | H04L 67/2819 713/162 |
| 2013/0318347 A1 | 11/2013 | Moffat | |
| 2014/0123307 A1 | 5/2014 | Jung et al. | |
| 2014/0201527 A1* | 7/2014 | Krivorot | G06F 21/6209 713/168 |

OTHER PUBLICATIONS

G. Naumovich and N. Merron, "Preventing piracy, reverse engineering, and tampering," in Computer, vol. 36, No. 7, pp. 64-71, Jul. 2003. (Year: 2003).*
Q. Liu, et al., "Digital rights management for content distribution," Proceedings of Australalasian information security workshop conference on ACSW frontiers, vol. 21, pp. 49-58, 2003.
E. Genov, "Designing robust copy protection for software products, " Proceedings of the 9th International Conference on Computer Systems and Technologies Workshop for PhD Students in Computing, 2008.
D. Kundur, et al., "Video fingerprinting and encryption principles for digital rights management," Proceedings of the IEEE, vol. 92, No. 6, pp. 918-932, Jun. 2004.
U.S. Notice of Allowance dated Jun. 5, 2018 for corresponding U.S. Appl. No. 14/894,919.
Application No. PCT/IB2014/061841, International Search Report and Written Opinion, dated Sep. 17, 2014.
"SourceGuardian," Version 10 for Windows User Manual, pp. 96, Jan. 17, 2013.
"PHP Javascript Obfuscator," Wiseloop, pp. 3, Oct. 18, 2012.

* cited by examiner

WEB APPLICATION PROTECTION

CROSS-REFERENCE TO RELATED APPLICATIONS

This application is a continuation application of and claims priority under 35 U.S.C. § 120/121 to U.S. application Ser. No. 14/894,919 filed Nov. 30, 2015, which is a national phase and claims priority under 35 U.S.C. § 371 to PCT International Application No. PCT/IB2014/061841 which has an International filing date of May 30, 2014, which designated the United States of America and which claims priority to U.S. Application No. 61/828,722 filed May 30, 2013, the entire contents of each of which are hereby incorporated by reference herein.

FIELD OF THE INVENTION

The present disclosure relates to web-based applications, specifically the present disclosure relates to systems and methods for protecting web-based applications.

BACKGROUND OF THE INVENTION

The variety of applications available for devices like laptops, mobile phones, tablets, netbooks, and other computing devices have not only increased demand for such devices but have also made them a necessity. In addition to basic communication/computing capability of the devices, the applications installed on the devices may allow users to perform varied functions like access information, improve interactivity with customers, work from remote locations, contact administrative departments, access multimedia content, etc. Generally, there may be two types of applications, namely, native applications, which may be developed using native technologies and tend to work on devices for which they are developed using closed compiled code; and web-based applications, which may be developed using a language readable by everyone, for example, a markup language (for example, hypertext markup language 5 (HTML5)) or JavaScript.

Application developers may develop an application using a language that is widely acceptable as it becomes easier for them to release versions of the application for all platforms. However, as the code may be accessible (for example, in clear text), it may give rise to code protection problems. For instance, competitors may steal the code and reuse it for their own applications, therefore, saving upon the initial investments (for example, time and cost) needed to produce an equivalent code; or there may be pirated versions of the code that may be leaked onto the web. These versions may be accessed by users who may be able to install and execute the code without buying it.

A number of techniques have been employed to counter this problem. For example, before the code is transmitted, it is encrypted using a random key or a hash key. At the client (for example, a mobile phone or a laptop) or the computing device, the encrypted code is decrypted by using the random key or hash key transmitted by the server. However, once the code is decrypted, it can be captured and installed on any other client. Therefore, there is a need for a mechanism that solves the above problems and provides for a protection mechanism for web-based applications.

SUMMARY OF THE INVENTION

The present disclosure obviates the above drawbacks and provides a method and apparatus for protecting a digital content. The digital content includes without limitation web applications.

In an embodiment, a method for generating a protected version of the digital content is provided. The method includes obfuscating the digital content to yield a functionally equivalent obfuscated digital content, encrypting the obfuscated digital content using at least one device or non-device parameter, generating a decryption logic to be used for generating a decryption key based upon the at least one device or non-device parameter, and concatenating the encrypted digital content and the decryption logic to generate the protected version of the digital content.

In accordance with another embodiment, the method for generating a protected version of a digital content includes: obfuscating the digital content to yield a functionally equivalent obfuscated digital content, installing at least one check in the obfuscated digital content such that the at least one check includes at least one device or non-device parameter, installing an execution control check in the obfuscated digital content forcing the obfuscated digital content to check with a server if the obfuscated digital content is allowed to execute on a client, encrypting the obfuscated digital content using the at least one device or non-device parameter, generating a decryption logic to be used for generating a decryption key based upon the at least one device or non-device parameter, and concatenating the encrypted digital content and the decryption logic to generate the protected version of the digital content.

In accordance with yet another embodiment, a system for protecting a digital content is disclosed. The system includes an obfuscation module to obfuscate the digital content such that the obfuscated digital content is a functional equivalent of the digital content, an encryption module to encrypt the obfuscated digital content using at least one device or non-device parameter, and an engine to generate a decryption logic to be used for generating a decryption key at a client based upon the at least one device or non-device parameter. Further, the engine concatenates the decryption logic and the encrypted digital content to generate the protected version of the digital content.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DESCRIPTION OF THE INVENTION

For the purpose of promoting an understanding of the principles of the invention, reference will now be made to the embodiments illustrated in the drawings and specific language will be used to describe the same. It will be understood by those skilled in the art that the foregoing general description and the following detailed description are exemplary and explanatory of the invention and are not intended to be restrictive thereof.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the stated purpose for the module. Indeed, a module of an executable code could be a single instruction, or many instructions, and may even be distributed over several different code segments, among different programs, and across several memory devices. Similarly, operational data may be identified and illustrated herein within modules, and may be embodied in any suitable form and organised within any suitable type of data structure. The operational data maybe collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The present disclosure provides a method and system of generating a protected version of a digital content on a computing device before transmission of the same. The method and system extends to digital content for example, web-based applications developed using without limitation, a markup language (for example, HTML5), JavaScript, Cascading Style Sheets (CSS), etc. In addition, the web-based applications may be developed using for example, mobile-specific frameworks and may include smaller components of native code. The web applications include without limitation, mobile applications, home appliances applications, automotive applications, clothing or wearable applications, smart watch applications, smart television applications, etc. In an embodiment, the method and system apply at least two layers of code transformation to the original source code of the digital content. The first layer may obfuscate the source code while the second layer may perform encryption on the obfuscated code. The present disclosure supports multi-file obfuscation, thus dealing with the complexity of multi-file symbol renaming.

Figure 1:
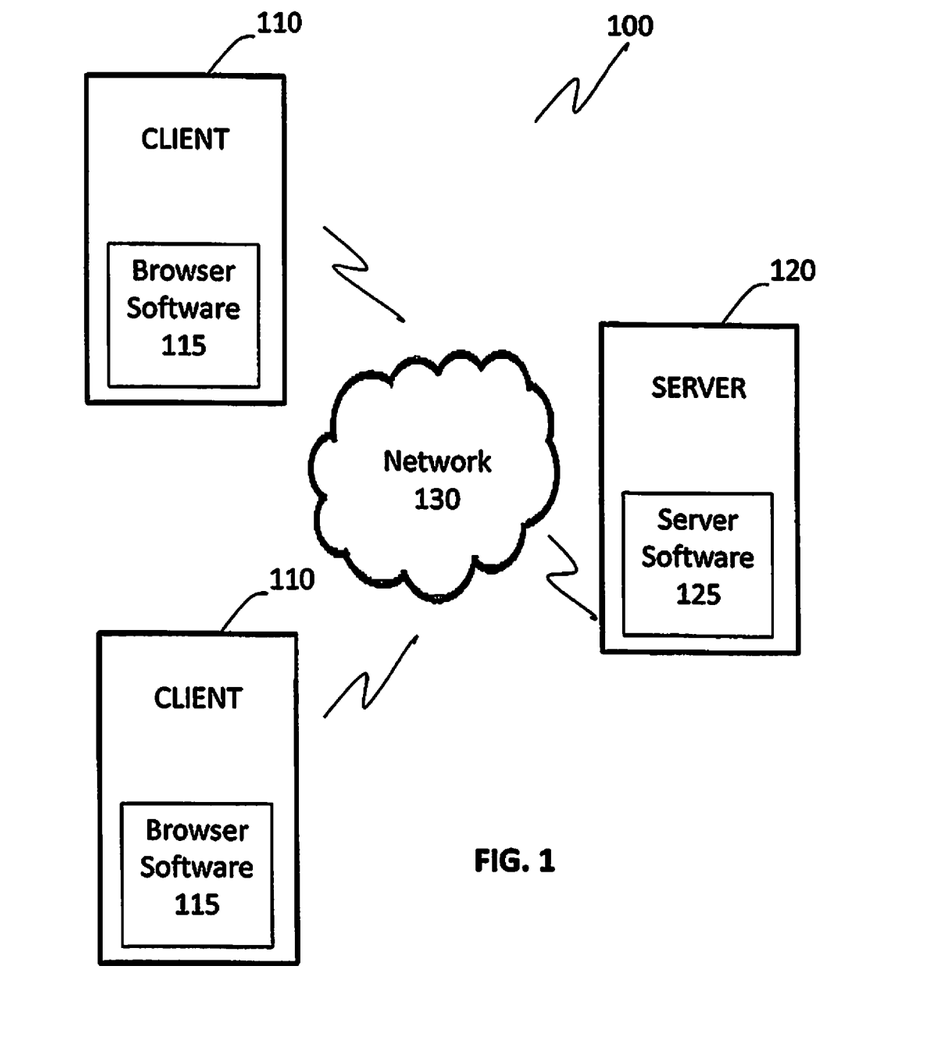
FIG. 1 is an exemplary diagram of an environment 100 in which systems and methods consistent with the principles of the invention may be implemented.

FIG. 1 is an exemplary diagram of an environment 100 in which systems and methods consistent with the principles of the invention may be implemented. Environment 100 may include multiple clients 110 connected to one or more servers 120 via a network 130. Network 130 may include a local area network (LAN), a wide area network (WAN), a telephone network, such as the Public Switched Telephone Network (PSTN), an intranet, the Internet, or a combination of networks. Two clients 110 and a server 120 have been illustrated as communicating via the network 130 for simplicity. In practice, there may be more or fewer clients and servers. Also, in some instances, a client may perform the functions of a server and a server may perform the functions of a client.

Clients 110 may be computing devices such as a wireless telephones, a personal computers, personal digital assistants (PDA), laptops, tablets or another type of computation and/or communication devices, a thread or process running on one of these devices, and/or an object executable by one of these devices. Server 120 may include a computational device for example a dedicated computer, that responds to the requests of one or more clients 110 and has data processing capability. Clients 110 and server 120 may connect to network 130 via wired, wireless, optical or any other type of connection that allows communication.

Clients 110 may include client software, such as browser software 115. Browser software 115 may include a web browser, such as Google Chrome or Netscape Navigator browsers. In a typical scenario, a user of client 110 using web browser 115 digital content (by URL, link within an email, link within a web page, or otherwise). The digital content includes without limitation, web applications. In the illustrated example, the request is sent to a known server 120. Client 110 receives the protected version of the digital content via Internet 130 from the server 120 (or other repository). As stated above, the protected version of the digital content can be a JavaScript code, an HTML code, Cascading Style Sheets (CSS), etc. Once the digital content is successfully decrypted, the underlying obfuscated digital content is executed as it is a valid executable code that maintains the underlying functionality of the original source code of the digital content.

Server 120 may operate as a web server and include appropriate web server software 125. In one implementation, web server software 125 may function as a protected digital content generation system. The web server software 125 may include an encryption module, an obfuscation module, a database, an interface and/or an engine for generating a protected version of the digital content after obfuscating and encrypting the digital content in a manner consistent with the principles of the invention. These will be further explained in FIG. 2. Although server 120 is illustrated as a single entity, in practice, server 120 may be implemented as a number of server devices.

Server 120 maybe used by for example, an application developer or an application distribution system which includes without limitation, application stores, websites, part of operating systems distributed in devices, etc. In an embodiment, when a client 110 requests for digital content, for example, a web application, from the server 120, the server 120 generates the protected version of that application on the fly and provides it to the user to download and install the application. Alternately, the server 120 may transmit a pre-generated protected version of the application to the client 110. In an embodiment, the server 120 generates the protected version of the application using one or more device parameters. In such cases, the protected version will work on the client 110 only if the application is decrypted successfully and executed on a correct client. In another embodiment, the server 120 generates the protected version of the application using one or more non-device parameters. In such cases, the protected version will work on any client 110 but the application will be concealed with obfuscation below encryption. In yet another embodiment, the server 120 generates the protected version of the application using one or more device and non-device parameters. In this case too, the application will work only when executed on a correct client after successful decryption.

Figure 2:
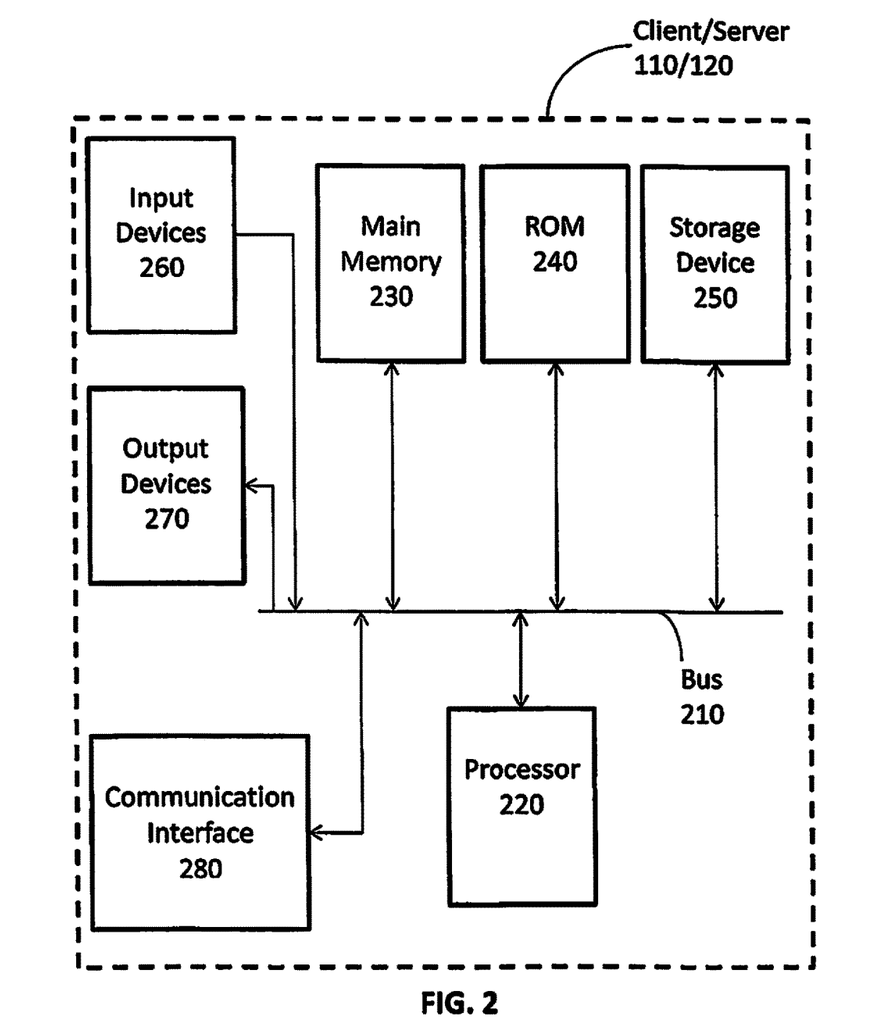
FIG. 2 is an exemplary diagram of a client 110 or server 120 according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor, or a combination of processors, that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, a touch screen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client/server 110/120 to communicate with other devices and/or systems. For example, communication interface 280 may include mechanisms for communicating with another device or system via a network, such as network 130.

The software instructions defining server software 125 and/or browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

As mentioned, server software 125 may implement a protected digital content generation system that, based on a client request, generates a protected version of a digital content. The digital content is first obfuscated and thereafter encrypted to generate a protected version as described below.

Figure 3:
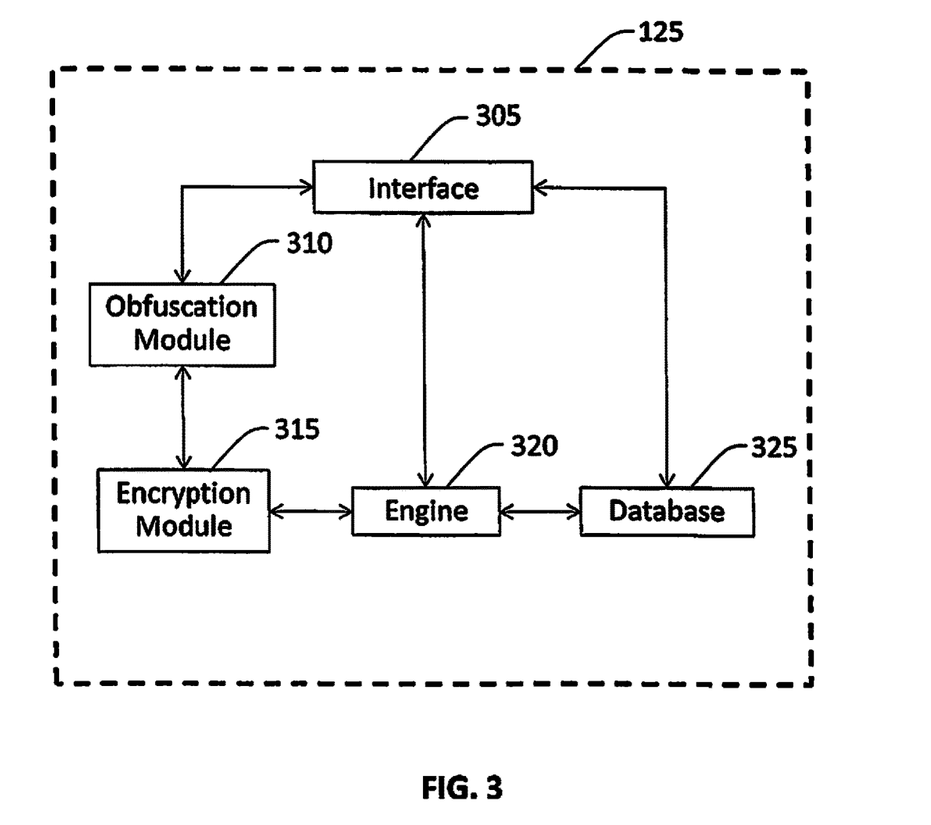
FIG. 3 is an exemplary functional block diagram illustrating an implementation of server software 125.

FIG. 3 is an exemplary functional block diagram illustrating one implementation of the server software 125. The server software 125 includes an interface 305, an obfuscation module 310, an encryption module 315, an engine 320 and a database 325. The interface 305 receives/responds to a query received from the client 110. For example, when the client 110 requests for download of digital content, the interface 305 receives the query and requests one or more parameters for example, a device parameter and/or a non-device parameter, from the client 110 or obtains the parameter from an entity associated with the client 110. The interface 305 specifies the one or more device or non-device parameter in the request for the client. A device parameter may be for example, a device model, a device number, a device type etc, while a non-device parameter may be for example, a Subscriber Identity Module (SIM) number, an Internet Protocol (IP) address, a domain name, etc. The interface 305 also transmits the requested content to the client 110. Optionally, the interface 305 may include a checking mechanism to determine if the requested digital content is stored in the database 325 or needs to be generated on the fly.

The obfuscation module 310 obfuscates the requested digital content using one or more obfuscation techniques resulting in an obfuscated digital content. The obfuscation techniques include without limitation device parameter obfuscation and non-device parameter obfuscation. Device parameter obfuscation includes without limitation device identifier (ID) obfuscation, device model obfuscation or any device feature obfuscation. Non-device parameter obfuscation includes without limitation, domain lock obfuscation, expiration date obfuscation, string obfuscation, etc. Domain lock obfuscation refers to locking the execution of the digital content on specified one or more Internet domain names. Expiration date obfuscation refers to a digital content not being executable after a particular date. Other obfuscation techniques include obfuscation using a device identifier, a device model, a device type, an expiration date, removing comments, renaming local, whitespace removal, dictionary compression, literal hooking, function reordering, literal duplicates, domain name, asserts elimination, dead code injection, debugging code elimination, dot notation, function outlining, renaming local or all, string splitting, etc. For instance, in literal hooking obfuscation, during obfuscation literals maybe replaced by a random number of ternary operators while in obfuscation via dot notation removal, dot notation representation form maybe replaced by alternative forms, like for instance, array notation. In removing literal duplicates, duplicate literals may be replaced by a symbol. In an embodiment, obfuscation may be done using a combination of device parameters and non-device parameters as mentioned above. It will be apparent to a person skilled in the art that other available obfuscation tools may be used and are within the scope and spirit of the present disclosure.

Optionally and in addition, before, during or after the obfuscation process, the obfuscation module 310 may spread traps all over the digital content to verify whether the digital content is running on an expected device. These traps may pertain to mechanisms that may verify without limitation, Internet domain name, device identifier (id), etc. Further, the obfuscation module 310 may also install one or more execution control checks in the digital content forcing the digital content to check with a server if the digital content is allowed to execute.

The obfuscated digital content is a masked version of the source code of the digital content and therefore, difficult to reverse-engineer. For instance, reversal of the obfuscated digital content to the source code may not be possible as when obfuscating, information such as the original variable names and/or function names may be lost. Further, in case checks relating to one or more device parameters are installed in the obfuscated digital content, it would be necessary that the digital content is actually executed on the correct device. However, if an attacker is not able to execute the obfuscated digital content successfully, it may be extremely difficult to reverse engineer. In one exemplary implementation when the obfuscated digital content is locked to a list of Internet domains, and the attacker tries to execute it on a different Internet domain, the obfuscated digital content cannot be reverse engineered. In fact, the digital content may be protected from theft and reuse by a competitor after code obfuscation as obfuscation lowers the code quality in terms of readability and maintainability, namely, it increases greatly the complexity of building upon the obfuscated code, and the simplest change may most likely break the code (i.e. change the functionality or make the code stop working altogether) or require tremendous amount of work to the point that the competitor may feel that it does not make sense to continue. All of these may lower the intrinsic value of the digital content and reduce the motivation of a competitor to steal the digital content as a quick-start to build something similar.

The encryption module 315 encrypts the obfuscated digital content using encryption techniques like symmetric or asymmetric encryption techniques. The encryption module 315 encrypts the obfuscated digital content with a function of a device parameter or a non-device parameter to provide an encrypted digital content (EC). Examples of a non-device parameter include subscriber identification module (SIM) number, domain name, IP address, etc. Examples of a device parameter include device ID, device model, etc. Thus, the encryption module 315 adds an extra layer of security to the obfuscated digital content. In various embodiments, the device and/or non-device parameters used for obfuscation and encryption may be the same or different.

The engine 320 generates and optionally, obfuscates a decryption logic (DC), needed to decrypt the encrypted digital content (EC). Decryption logic includes the logic required for generating a decryption key to be used to decrypt EC. The decryption logic may use one or more encryption techniques, namely, symmetric and asymmetric encryption techniques. The engine 320 concatenates DC and EC resulting in a protected code (PC). Thus,

EC+DC=PC

It is to be noted that the protected version of the digital content does not contain the decryption key rather it contains the decryption logic that in turn generates the decryption key. The decryption key may be a function of for example, device model, device make, IP address of the device, device ID (DID), etc.

The database 325 stores the protected version of the digital content.

It may be seen from the above that the server software 125 provides for transformation of the original source code of the digital content into an equivalent code in terms of functionality such that the equivalent code (namely, protected version of the digital content) is protected using the techniques described above. The underlying code (namely, the original source code) of the digital content is dually protected (via obfuscation and encryption) and executes on a client only when it is decrypted after successful decryption key generation.

Figure 4A:
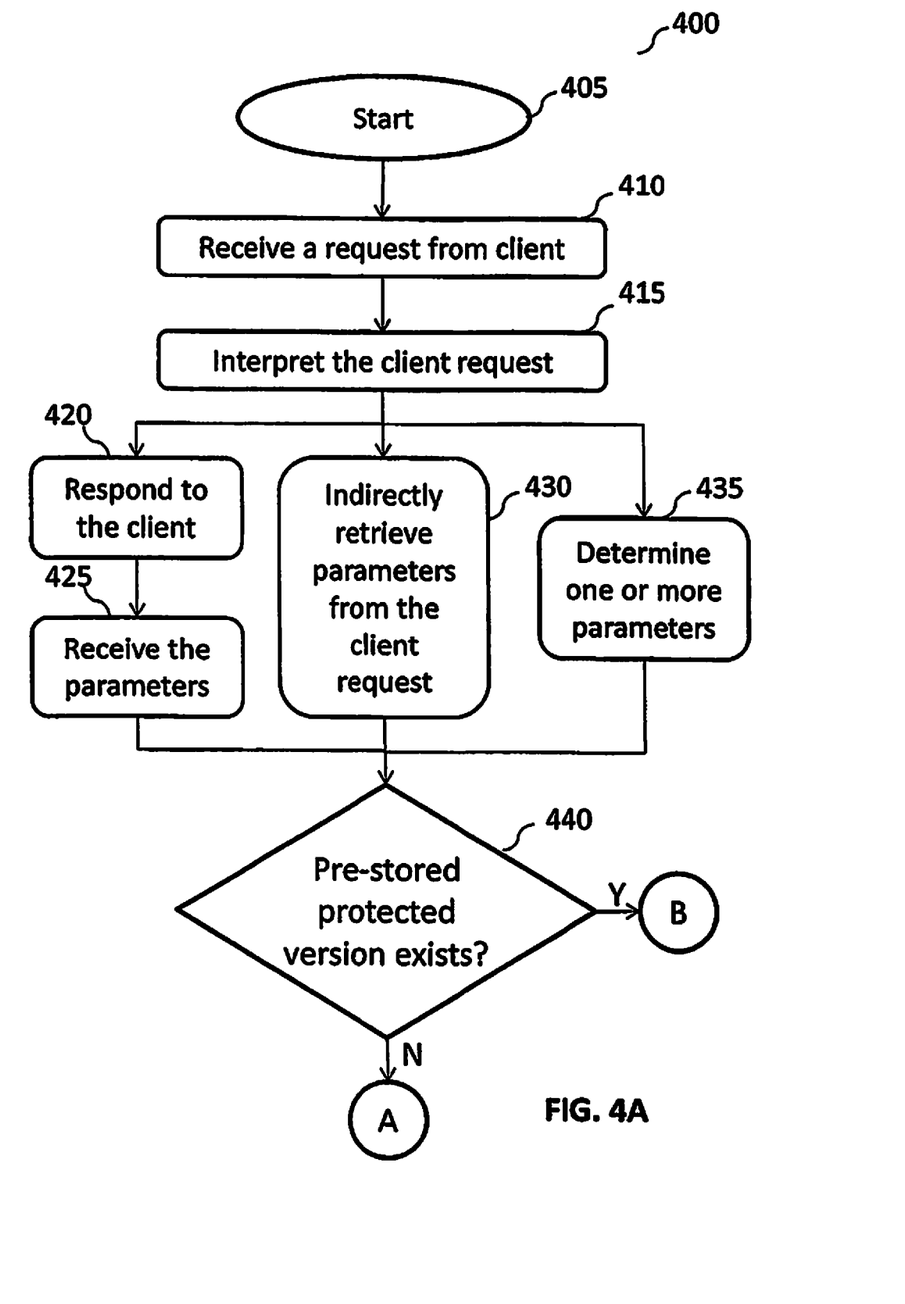
FIG. 4A and FIG. 4B illustrate an exemplary flowchart 400 depicting the process followed at the server 120 for generating a protected version of the digital content.
Figure 4B:
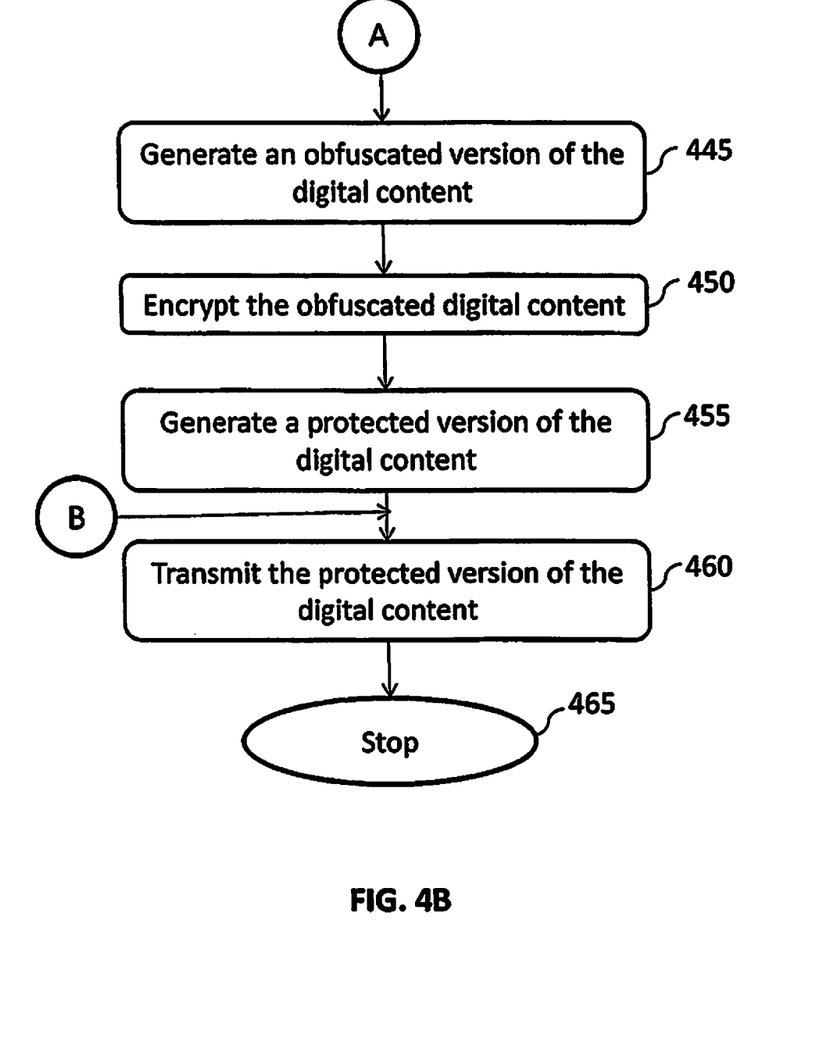

FIG. 4A and FIG. 4B illustrate a flowchart 400 depicting the process followed at the server 120 for generating a protected version of the digital content based upon a parameter (for example, a device and/or non-device parameter). At step 405, the server initiates the process of generating a protected version of the digital content. At step 410, the server receives a request from a client for transmitting the digital content. The request may be for example, a Hypertext Transfer Protocol (HTTP) or Hypertext Transfer Protocol Secure (HTTPS) request. Thereafter, the interface interprets the client request at step 415. For example, the interface may require one or more parameters, for example, a device parameter and/or a non-device parameter from a client. In such case, the interface may request and specify the one or more parameters in its response to the client at step 420. Subsequently, the interface receives the one or more parameters at step 425. Alternately, at step 430, the interface may indirectly retrieve the one or more parameters from the client request received at step 410. For example, the interface may determine the IP address from the IP protocol via which the request is received at step 410. Alternately, at step 435, the interface may determine one or more parameters for example, non-device parameters to be used for generating the protected version of the digital content. The determination may be either random or based upon a pre-configured logic.

Once the one or more device/non-device parameters are determined, at step 440, the interface examines whether a pre-stored protected version of the digital content exists in the database. For example, in case the parameter is a device id, the interface may examine if a protected version of the digital content for the corresponding device id is stored in the database. If the protected version of the digital content is stored in the database, the process jumps to step 460. In case a pre-stored version is not available, the interface initiates the process for generating the protected version of the digital content on the fly.

At step 445, an obfuscated version of the digital content is generated. The obfuscated digital content may be a masked version of the original digital content which is functionally equivalent. Optionally, one or more traps may be installed before, during or after the obfuscation process of the digital content. The traps may be for example, short codes that require verification of the one or more parameters contained in the trap while the digital content is executed on a client. Thereafter, at step 450, the encryption module encrypts the obfuscated digital content with the one or more determined device or non-device parameters in steps 425, 430 or 435 using symmetric or asymmetric encryption techniques to provide encrypted digital content (EC).

At step 455, a protected version of the digital content which is to be transmitted to the client is generated. The engine generates a decryption logic (DC) which upon execution, generates a decryption key. This decryption logic is executed at the client and will generate the decryption key using the one or more determined device or non-device parameters in steps 425, 430 or 435. Optionally, the engine obfuscates the decryption logic. The engine concatenates the encrypted digital content (EC) and the decryption logic (obfuscated or otherwise) to generate a protected version of the digital content. Thus, the protected version of the digital content (PC) does not contain the decryption key rather it contains the decryption logic that in turn generates the decryption key on the client during execution. The decryption key may be a function of a device or non-device parameter.

At step 460, the protected version is transmitted to the requesting client. The process stops at step 465.

Figure 5:
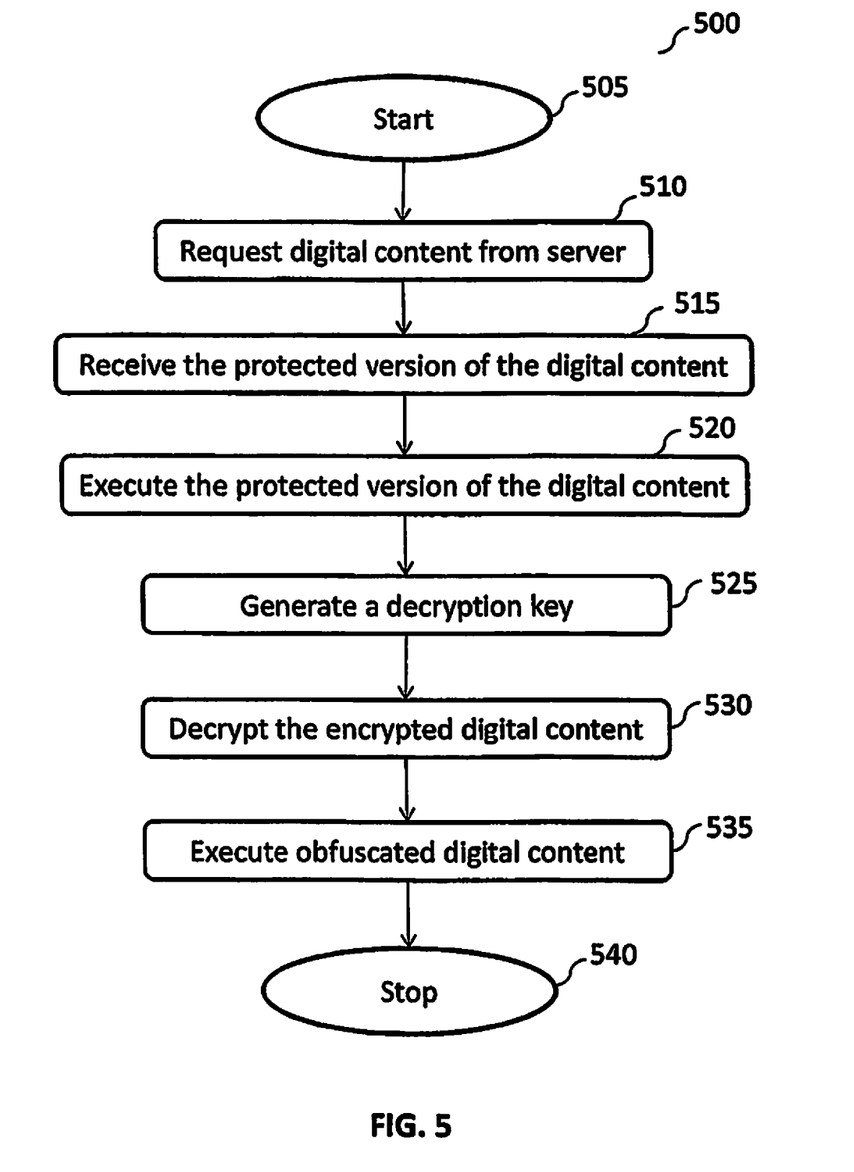
FIG. 5 illustrates an exemplary flowchart 500 depicting the process followed at the client 110 for executing a protected version of the digital content.

FIG. 5 illustrates a flowchart 500 corresponding to the process at the client for executing the protected digital content. At step 505, the process at client initiates. At step 510, the client requests digital content from the server. For example, a user of the client accesses a webpage via a web browser and clicks on a download button of the webpage to obtain the digital content. At step 515, the client receives the protected version of the digital content transmitted by the server to the web browser. In an embodiment, before the digital content is provided to the client, the client may provide one or more parameters to the server. The server may utilize this information to generate the protected version of the application before transmitting it to the browser of the client. Alternately, the client may be required to download and install a module required for downloading the protected version of the digital content. Exemplary implementations include installation of the module in the factory with the operating system or one-time installation by the user.

At step 520, the protected version of the digital content is executed which includes the encrypted digital content and the decryption logic. The decryption logic initiates generation of the decryption key at step 525. For this, the decryption logic requires one or more parameters. In case the parameter is a device parameter, the decryption logic accesses device information directly or indirectly, using for example, JavaScript. Indirect access to a device identifier (DID) may include the use of native code or native frameworks specific to a mobile platform. A correct decryption key will be generated only if the protected version of the digital content is executed on a correct client device. However, in case the parameter is a non-device parameter, the decryption logic may obtain the same by requesting it from the server. Alternately, the key may be embedded with the decryption logic. In an embodiment, the decryption logic retrieves the decryption key every time the digital content is executed and may be automatic and transparent to the client user. As an alternate to this, the client may receive the decryption key on the fly.

At step 530, the encrypted digital content is decrypted using the decryption key generated at the client. The decryption process will be successful only if the decryption key is correct device otherwise the decryption process will fail and result in an invalid obfuscated digital content. For example, if the application is protected for a given device model but is placed on a different device for execution, the application may fail to execute. The decrypted digital content results in retrieving the obfuscated digital content on the client. At step 535, the obfuscated digital content is executed as it is a valid executable code that maintains the underlying functionality of the original source code. The underlying obfuscated digital content can be executed by for example, JavaScript engine running on the client. During or before execution of the obfuscated digital content, one or more obfuscated checks are conducted. For example, an expiration date check may ensure that an digital content user may not continue to use the digital content post its subscription period. In this embodiment, the expiration of the digital content period may be checked by communicating with the server if the digital content is allowed to execute. The process stops at 540.

A number of variations of the various embodiments described above are within the scope of the teachings of the present disclosure. For example, the protected version of the digital content may be encrypted/obfuscated multiple times. Another example would pertain to obfuscation/encryption of the decryption logic. Accordingly, it may be noted that any such variations are within the scope of the present disclosure.

The present disclosure offers many advantages. In an embodiment, the protected digital content (PC) may force the digital content to check with an online server if it has the permission to execute or not each time the application is accessed. This may provide the application developer or the application distribution service to remotely control whether the application should execute or not. Optionally, using this feature, the application distribution service may sell applications on a subscription basis. This may be advantageous because it may have the potential to reduce the risk for buyers as the buyers may pay per use basis.

Another advantage of the teachings of the present disclosure includes providing an application developer or the application distribution service with rich statistics about an application usage.

No element, act, or instruction used in the description of the present application should be construed as critical or essential to the invention unless explicitly described as such. Also, as used herein, the article "a" is intended to include one or more items. Where only one item is intended, the term "one" or similar language is used.

The invention claimed is:

1. A method for generating a protected version of a digital content in a server, wherein the digital content comprises an original source code, the method comprising:
   obfuscating the digital content to yield an obfuscated digital content, wherein the obfuscated digital content comprises a valid executable code that maintains an underlying functionality of the original source code of the digital content;
   encrypting the obfuscated digital content using at least one device or non-device parameter to yield an encrypted digital content, wherein the encrypted digital content can be decrypted using a decryption key, and wherein the decryption key is based on the at least one device or non-device parameter;
   generating a decryption logic configured to generate the decryption key using the at least one device or non-device parameter at a client;
   concatenating the encrypted digital content and the decryption logic to generate the protected version of the digital content; and
   sending the protected version of the digital content such that the client is permitted to generate the decryption key using the decryption logic and the at least one device or non-device parameter such that (i) the decryption logic accesses the at least one device or non-device parameter directly from the client when the at least one device or non-device parameter includes a device parameter, (ii) the decryption logic accesses the at least one device or non-device parameter directly from the server when the at least one device or non-device parameter includes a non-device parameter, (iii) the decryption logic generates the decryption key only if the at least one device or non-device parameter fetched from the client is correct, and (iv) the protected version of the digital content is executed on the client only after a successful decryption of the encrypted digital content using the generated decryption key.

2. The method of claim 1 further comprising receiving at the server the at least one device or non-device parameter.

3. The method of claim 1, wherein the obfuscating comprises obfuscating using one or more of a device identifier, a device model, a device type, an expiration date, removing comments, renaming local, whitespace removal, dictionary compression, literal hooking, function reordering, literal duplicates, domain name, asserts elimination, dead code injection, debugging code elimination, dot notation, function outlining, renaming local or all and/or string splitting.

4. The method of claim 1, wherein the encrypting comprises encrypting the digital content in real-time.

5. The method of claim 1, wherein the encrypting comprises encrypting using at least one symmetric and/or asymmetric encryption techniques.

6. The method of claim 1 further comprising obfuscating the decryption logic in the server.

7. The method of claim 1 further comprising installing at least one trap in the obfuscated digital content in the server, wherein the at least one trap comprising the at least one device or non-device parameter.

8. The method of claim 1 further comprising at least one of encrypting or obfuscating the protected version of the digital content in the server.

9. The method of claim 1 further comprising installing one or more execution control checks in the digital content, the execution control checks to be conducted every time the digital content is executed on the client.

10. The method of claim 1, wherein the at least one device or non-device parameter comprises one or more of a device number, a device type, and a device model.

* * * * *